Patented Mar. 1, 1927.

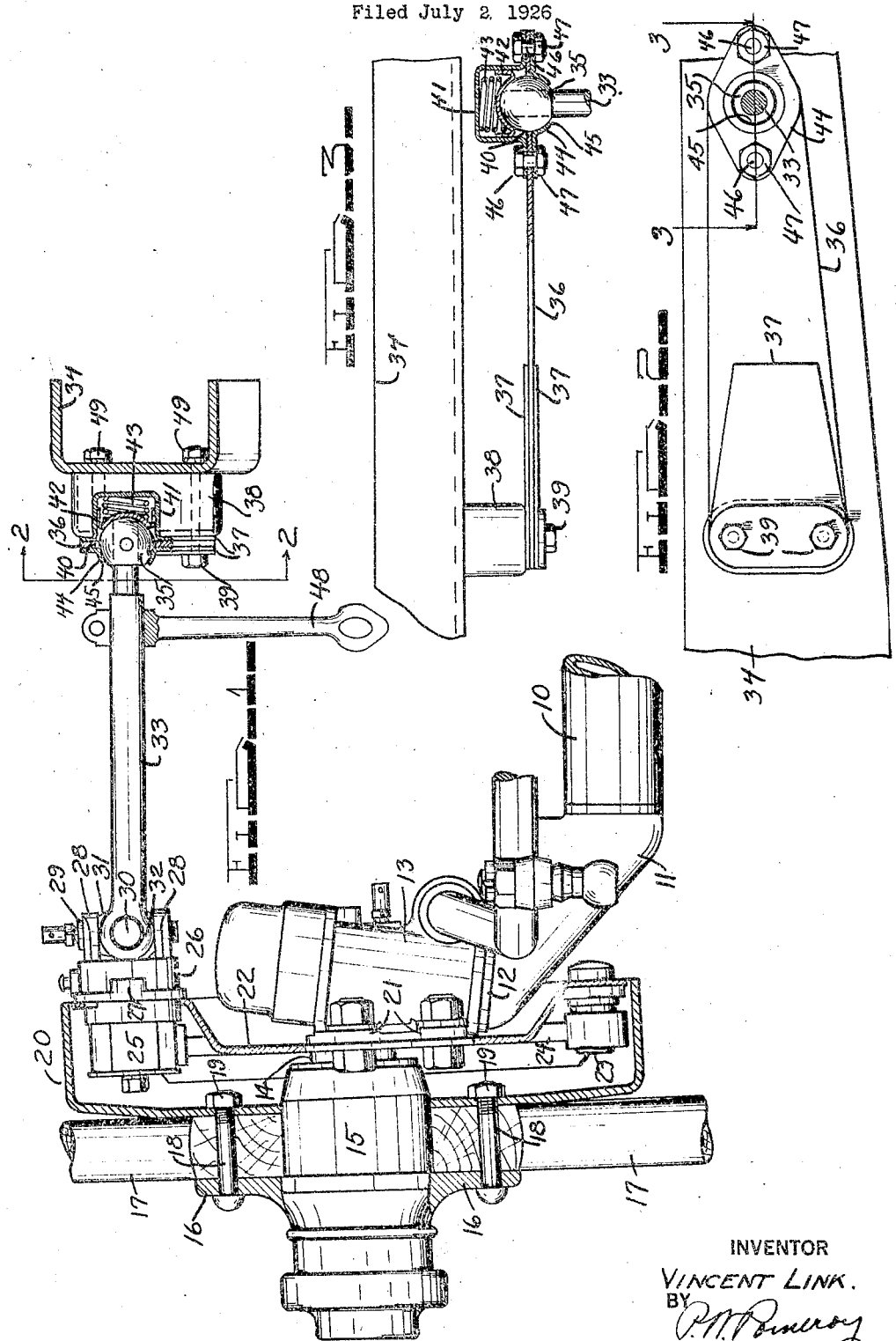

1,619,262

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed July 2, 1926. Serial No. 120,126.

This invention relates to brake mechanisms for motor vehicles, and particularly to means for anchoring the free ends of the brake-operating shafts at the chassis frame, the principal object being to provide a construction that is simple, efficient and economical to manufacture.

Another object is to provide a simple means for anchoring the free end of a brake-actuating shaft to the chassis frame, in such a manner as to permit operation of the same regardless of the position of the chassis frame relative to the vehicle axle.

Another object is to provide means for flexibly anchoring the free end of a brake-actuating shaft to the chassis frame.

A further object is to provide means for pivotally supporting the free end of a brake-actuating shaft in a spring-pressed socket attached to the end of a flat spring member, which is anchored to the vehicle frame side member.

These being among the objects of the present invention, the same consists of certain features of construction and combinations of parts to be hereinafter described with reference to the accompanying drawing and then claimed, having the above and other objects in view.

In the accompanying drawing, which illustrates a suitable embodiment of the present invention:—

Figure 1 is a partial section taken vertically through the left front wheel of a motor vehicle chassis and through the adjacent frame side member thereof, clearly showing the construction of the inner end of the brake-operating shaft.

Figure 2 is a side view taken on the line 2—2 of Figure 1 looking toward the vehicle frame, showing the anchoring socket and flat spring member secured to the chassis frame side member.

Figure 3 is a partial section taken on the line 3—3 of Figure 2, showing the anchoring socket and its connection to the frame side member.

Referring to the accompanying drawing, in which like numerals refer to like parts throughout the several views, the embodiment of the present invention is shown in connection with the front wheel brake mechanism of a motor vehicle, to which it is particularly adapted. Shown in Figure 1 is a front axle 10 of the tubular type having an end member 11 which terminates in an upwardly extending shaft 12 upon which the steering knuckle 13 is pivotally supported.

The knuckle 13 is provided with the conventional wheel spindle 14 upon which the wheel hub 15 is supported and is free to rotate. The hub 15 is provided with a flange portion 16 against which the wheel spokes 17 abut and which are secured thereto by bolts 18 and nuts 19, which also serve to support and secure the brake drum 20 to the hub 15 in concentric relation therewith. The knuckle 13 is formed with flanges 21 to which the brake drum dust cover 22 is secured in concentric relation with the drum 20, which cover closes the open end thereof.

Within the brake drum 20 and pivotally supported on adjacent pins 23 secured to the dust cover 22 are two brake shoes 24, the outer surfaces of which normally lie just out of contact in relationship with the inner surface of the drum 20, and whose free ends are drawn against the expanding cam 25 by a spring (not shown) extending therebetween. The cam 25 is formed on the end of a short shaft which projects through the dust cover 22 and is rotatably supported in the bracket 26, which also projects through the dust cover 22 and is secured thereto by screws or bolts which pass through the flanges 27 thereof.

In constructions of this type, wherein the brake-operating shaft is supported at one end on the frame of the vehicle and the other end is on, or on a part supported by, the end of the axle, the distance between the point of support on the frame and on the axle varies with the movement of the axle relative to the frame, due to both horizontal and vertical movement of the springs which support the frame on the axle. The present invention deals with means for compensating for the action.

As has been described, the bracket 26 is secured to the dust cover 22 which supports it and which is relatively stationary in respect to the axle 10, by the screws or bolts which pass through the dust cover 22 and into the flanges 27. As has also been described, the bracket 26 rotatably supports a short shaft having the cam 25 formed on an end thereof. The end of the shaft opposite the cam 25 is formed to provide two arms 28 which make up one yoke of a universal joint comprising cross pins 29 and 30, a block 31 and a yoke 32 formed on the outer end of the operating shaft 33. The operating shaft 33 extends inwardly toward, and terminates short of, the vehicle side frame member 34, and terminates in a ball-shaped end 35. This end 35 is received in a socket secured to the free end of a flat spring 36 positioned between two spring members 37 of less length, all three of which are held in spaced relation to the frame side member 34 by a spacing block 38 and are secured to the frame member 34 by bolts 39 and nuts 49 somewhat rearwardly of the ball and socket connection.

The free end of the spring 36 is provided with an opening 40 to receive the ball-end 35 of the operating shaft 33. Positioned on one side of the spring 36 over the opening 40 is a housing 41 containing a cup 42 having a spherically shaped seat, which is forced against the ball end 35 by a compressed coil spring 43 positioned between it and the bottom of the housing 41. On the other side of the flat spring 36 is a ball retainer member 44, which bears against the portion of the ball 35 lying on that side of the opening 40, and is provided with a central opening 45 to allow the operating shaft 33 to extend therethrough.

Bolts 46 extend through the housing 41, the spring member 36, and retainer 45, and nuts 47 threaded on the bolts 46 firmly secure the same together and cause the coil spring 43 to remain in compression, thereby holding the ball end 35 snugly between the cup 42 and retainer member 44. A rock lever 48 is secured to the shaft 33 and is adapted to cause movement thereof when rotated about its axis, thereby acting to cause rotation of the cam 25 and spreading of the brake shoes 24 into contact with the drum 20 to effect a braking action on the wheel.

The action of the construction just described is apparent, and as the vehicle is passing over rough roads and the like, the frame, due to the springing action, is continually jouncing up and down relative to the axle, and naturally the distance between the universal joint connection at the outer end of the operating shaft and the point of support at the free end changes correspondingly. To compensate for the movement of the frame relative to the axle the ball end of the shaft pivots universally in its socket and the flat spring member 36 flexes inwardly or outwardly, according to the motion of the frame.

It is also apparent that the brakes may be easily applied, regardless of the position of the frame relative to the axle because of the pivotal action of the shaft end when the same is rocked by the lever. As shown in the several figures of the drawing, the flat spring 36 is in compression when the lever is pulled backwardly, or rather clockwise, to apply the brakes and it is to be understood that the point of attachment to the frame may be placed forwardly of the operating shaft to put the spring member in tension instead of compression as illustrated, or may be placed above or below the shaft.

Formal changes may be made in the specific embodiment of the invention described without departing from the spirit and substance of the broad invention, the scope of which is commensurate with the appended claims.

What I claim is:

1. In a motor vehicle, braking means for a wheel thereof, a brake-operating shaft extending inwardly from said braking means, and means for supporting the inner end of said shaft comprising a spring secured at one end to the frame of said vehicle and at the other end to the inner end of said shaft.

2. In a motor vehicle, braking means for a wheel thereof, a brake-operating shaft extending inwardly from said means and terminating adjacent a frame member of said vehicle, and means for supporting the inner end of said shaft comprising a spring secured to both said frame and to said shaft.

3. In a motor vehicle, braking means for a wheel thereof, a brake-operating shaft extending inwardly therefrom and terminating adjacent a frame member, and means for supporting the inner end of said shaft, said means comprising a spring secured at one end to said frame member and provided with means for pivotally supporting the inner end of said shaft at its other end.

4. In a motor vehicle, braking means for a wheel thereof, a brake-operating shaft extending inwardly therefrom and terminating in a ball end, and means for supporting the inner end of said shaft from the frame of said vehicle comprising a leaf spring rigidly secured to said frame at one end and provided with a socket for receiving said ball end of said shaft at its other end.

5. In a motor vehicle, braking means for a wheel thereof, a brake-operating shaft extending inwardly therefrom and terminating short of the frame of said vehicle, and means for supporting the inner end of said shaft to allow axial movement thereof relative to said frame, said means comprising a spring plate secured at one end to said frame in spaced relation thereto, and secured to the inner end of said shaft at its opposite end.

6. In a motor vehicle, braking means for a wheel thereof, a brake-operating shaft extending inwardly therefrom, and means for supporting the inner end of said shaft to allow axial movement of said shaft relative to the frame of said vehicle, said means comprising a spring plate secured to said frame at one end and secured to the inner end of said shaft at the other end, and an auxiliary spring plate for stiffening the first-mentioned plate adjacent its point of attachment to said frame.

7. In a motor vehicle, braking means for a wheel thereof, a brake-operating shaft extending inwardly therefrom and terminating in a ball end, and means for supporting said ball end, said means comprising a spring plate secured at one end to the frame of said vehicle, and provided with resilient spring means at the other end thereof for pivotally socketing said ball.

8. In a motor vehicle, braking means for a wheel thereof, a brake-operating shaft universally connected to said braking means and extending inwardly therefrom and terminating in a ball end, and means for supporting the inner end of said shaft from the frame of said vehicle to allow axial movement thereof, said means comprising an elongated spring plate secured to said frame at one end and provided with an opening at the opposite free end, said ball end being centrally positioned in said opening with respect to said spring, and sockets secured to said spring for securing said ball end in said opening.

9. In a motor vehicle, braking means for a wheel thereof carried by an axle of said vehicle, a brake-operating shaft extending inwardly from said means and terminating in a ball short of the frame of said vehicle, and means for supporting the inner end of said shaft to allow axial movement thereof comprising a cantilever spring secured at one end to said frame and provided with an opening at its opposite end for receiving said ball, an apertured plate provided with a spherical seat encircling said shaft and secured to said spring over one side of said opening, a cup member secured to said spring and closing the other side of said opening, and a spring-pressed button within said cup for resiliently holding said ball against said spherical seat.

Signed by me at Detroit, Michigan, U. S. A., this 29th day of June, 1926.

VINCENT LINK.